Nov. 22, 1966     P. A. MONGERSON     3,286,720
DIVERTER ASSEMBLY—VACUUM TYPE
Filed March 16, 1964     2 Sheets-Sheet 1

INVENTOR.
Paul A. Mongerson,
BY Parker & Carter
Attorneys.

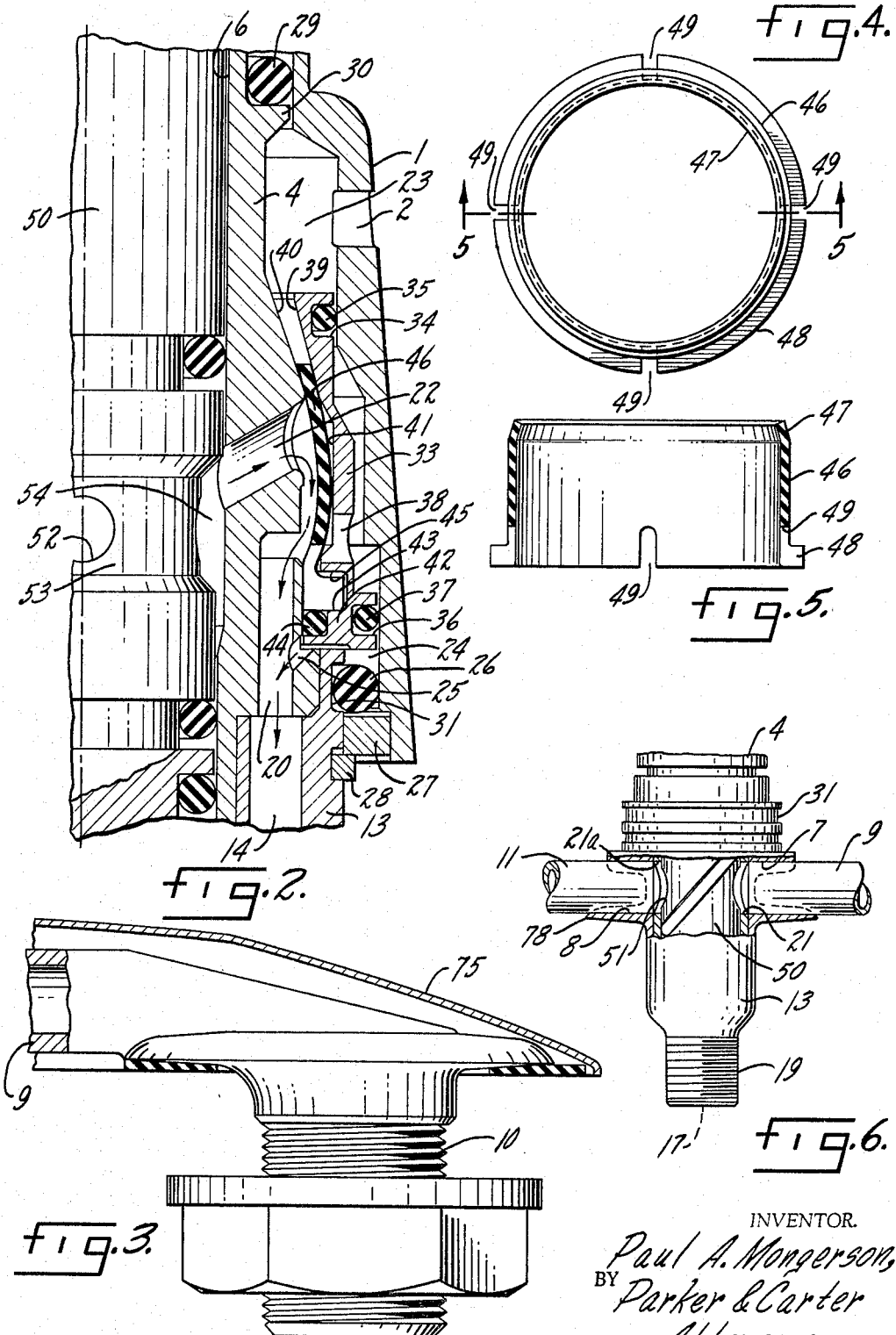

3,286,720
Patented Nov. 22, 1966

3,286,720
DIVERTER ASSEMBLY-VACUUM TYPE
Paul A. Mongerson, Elyria, Ohio, assignor to Standard Screw Company, Bellwood, Ill., a corporation of New Jersey
Filed Mar. 16, 1964, Ser. No. 352,225
14 Claims. (Cl. 137—119)

This invention relates to a mixing faucet arranged to receive two liquids and mix them and to discharge the mixture of the two liquids.

Preferably, it relates to a mixing faucet arranged to discharge liquid selectively in one of two directions.

It has therefore for one object to provide such a mixing faucet and to provide in such a faucet a diverter means arranged to control the path of discharge of the mixed liquid.

Another object of the invention is to provide, in a faucet of the type indicated having a diverter, means for insuring rapid and positive movement of the diverter to accomplish rapid and desired control of movement of the mixed liquid in the discharged direction.

Another object is to provide diverter means suitable for combination within a mixing faucet made in accordance with the disclosure.

Other objects will appear from time to time throughout the specification and claims.

This invention is illustrated more or less diagrammatically in the following drawings wherein:

FIGURE 2 is a sectional detail taken on an enlarged scale illustrating a position of the diverter different from that illustrated in FIGURE 1.

FIGURE 3 is a sectional detail with parts in elevation showing an inlet for liquid into the faucet housing.

FIGURE 4 is a detail plan view of the flexible or yielding member of the diverter.

FIGURE 5 is a sectional view taken at line 5—5 of FIGURE 4.

FIGURE 6 is a side elevation on a reduced scale showing an arrangement of two water supply means through which hot and cold water are delivered to the faucet assembly.

Figure 1:
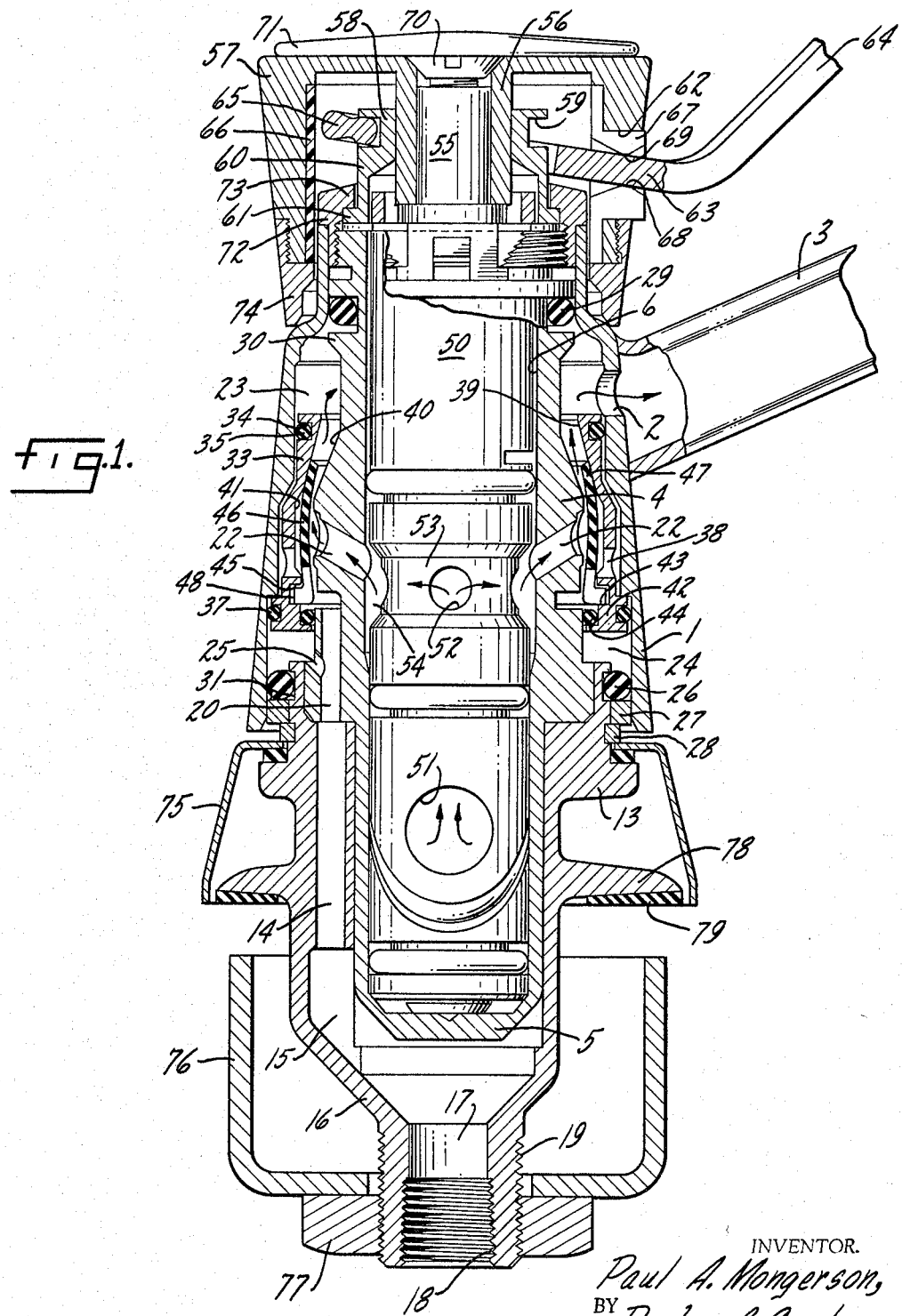
FIGURE 1 is a longitudinal section through the faucet with parts in elevation.

Like parts are designated by like characters throughout. As shown in FIGURE 1 generally, the faucet assembly includes a generally conical valve housing 1. This member is provided with a port 2 with which a spout or other discharge element 3 may communicate. This spout is secured to the housing 1.

The housing 1 is mounted to swing about a hollow valve body 4 which is open at its upper end and closed at its lower end as at 5. This valve body is arranged to receive a valve member and to cooperate with the valve member as will be described below. The valve body 4 is shaped to provide a cylindrical bore which is of two diameters, the larger being toward the open end. It is indicated by the numeral 6. The valve body 5 is provided with a plurality of inlet ports, normally two ports, through which hot and cold water are discharged into the valve body 4. These inlets ports and their connections are shown in detail in FIGURE 6 and are numbered 7 and 8. Port 7 may be considered as the inlet port for cold water and is connected to a supply pipe 9 which is itself joined to a union 10 connected to the cold water supply system which is not shown. The hot water inlet port 8 is connected to a supply pipe 11 which is itself joined to a second union 10 not shown. The union 10 is connected to a supply source of hot water which is not shown.

The valve body 4 has positioned about it a connection member 13. This member 13 might be integral with the valve body 4. They are, however, in the present instance, made separately and assembled as a matter of manufacturing convenience and economy. The connection member is shaped to provide a discharge passage 14 which leads to a chamber or passage 15 within a tapered portion 16 of the member 13. The portion 16 terminates in an outlet 17 which is threaded internally at 18 and externally at 19 for connection to a hose or other discharge means. The hose, which is not shown and whose details form no part of the invention, will generally carry at its free end a tool such as a spray for use in spraying water and adjacent to the spray will be a valve which may be opened at will to cause discharge of water through the hose and the spray when desired.

The discharge passage 14 and the member 13 are connected to another discharge passage 20 in the valve body 4. The valve body 4 and the connection member 13 which is positioned about 1 are provided with communicating inlet openings 21 and 21a through which respectively cold and hot water enters the mixing chamber within the valve body 4. The valve body is also provided with a plurality of discharge openings 22, through which liquid may flow from the interior of the valve body 4 to the space generally bounded by the exterior of the valve body 4 and the interior of the housing member 1. It is from this space between the members 1 and 4 that the outlet passage 2 serves to discharge liquid into the spout 3.

The space bounded by the exterior of the valve body 4 and the interior of the housing 1 from which both paths of discharge lead is designated generally by the numeral 23. Its lower portion which serves a special purpose is designated by the numeral 24. At times, this space 24 is substantially filled by a diverter which will be described below. The diverter is shown in FIGURE 2 in the position in which it substantially fills the space or chamber portion 24. A fluid passage 25 leads from the space 24 to the outlet 20 which in turn communicates with the outlet 14 leading to the hose connection.

The space between the housing 1 and the member 13 is sealed at its lower end by a single O-ring 26. The housing 1 is mounted to rotate with respect to the valve body 4 and with respect to the member 13 which is itself fixed upon the valve body. A ring 27 is positioned as shown in FIGURES 1 and 2 adjacent the lower end of housing 1 and is held in place by a lock ring 28.

Adjacent its upper end, the housing 1 is sealed with respect to the valve body by a single O-ring 29 which is held against displacement by a shoulder 30 on the exterior of valve body 4. The O-ring 26 is correspondingly held against displacement by a groove 31 which may be formed in the member 13.

A diverter is positioned in the space designated by the numerals 23 and 24 and is mounted for limited vertical or longitudinal reciprocation. The diverter includes an external shell 33 which will be of metal or other relatively rigid material. It is generally hollow or ring-shaped and is of varying diameters both externally and internally. It is grooved on its exterior adjacent its upper end as at 34 to receive an O-ring 35. Toward its lower end, it is enlarged in diameter externally and is provided with portions which define a groove 36 within which is positioned an O-ring 37. The O-rings 35 and 37 are in sealing contact with the interior surface of the housing 1 which is itself of varying diameter. The shell 33 of the diverter is provided with one or more perforations 38 through which water from within the diverter may pass outwardly.

The diverter shell 33 is provided internally adjacent its upper end with an inwardly inclined surface 39. Generally opposite the surface 39 of the diverter sleeve, the valve body member 4 is provided with an outwardly inclined surface 40. The diverter shell is flared outward below the surface 39 to provide its maximum internal diameter at the area 41. The diverter shell 33 is provided adjacent its bottom with an inwardly extending portion 42 which is shaped to define a shoulder 43 upon which an O-ring 44 is received. The diverter body is also grooved adjacent the shoulder 43 as at 45.

Positioned within the diverter shell is a flexible diverter member which is in generally ring-like or sleeve-like form and comprises a wall portion 46 which may be inwardly directed adjacent its upper edge as at 47. At its lower edge, it has an outwardly extending and preferably thickened flange 48. The flange and an adjacent portion of the wall 46 may be interrupted by notches or cut-away portions 49 which as shown in FIGURES 4 and 5 cuts through the flange 48 and through a lower or adjacent portion of the wall 46.

When the diverter is assembled, the flexible member is positioned within the rigid shell as shown in FIGURES 1 and 2, the flange 48 of the flexible member being received within the groove or depression 45 on the interior of the shell 33. The flange 48 may rest upon the shoulder 43 as shown for example in FIGURE 2.

The thickness of the wall portion 46 and particularly its upper margin portion 47 is of such thickness that when the diverter is in the raised position as shown in FIGURE 1, it is out of contact with the surface 40 of the valve body 4. When the diverter is lowered in a manner which will be described below, the portion 47 is gripped between the surfaces 39 and 40 and closes the passage toward the outlet 2 and the spout 3, hence the liquid flow cannot continue to the spout 3. When this occurs, the flexible portion may be bowed outwardly by the water flowing in the direction of the arrows. This is shown in FIGURE 2. The wall 46 may even contact the shell at its point of greatest internal diameter 41, also shown in FIGURE 2. Whatever the degree of outward movement or bowing of the portion 46 may be, it is sufficient to establish a clear path for liquid to the passage 20 and through it to the passage 14 and thence to the hose. The path of liquid during the time that the valve is open and the diverter is lowered is indicated by the arrows in FIGURE 2. The path of the liquid during the time that the valve is open and the diverter is raised is indicated by the arrows in FIGURE 1.

The valve which has been referred to but which has not been described in detail is substantially that shown in Patent 3,103,231, issued to Alfred M. Moen on September 10, 1963 on an application filed February 3, 1960. The present application preferably utilizes the valve cartridge shown in the said patent. The details of that cartridge need not be re-described in this application. It is sufficient to say that the cartridge includes a hollow sleeve 50 which when the faucet is assembled is fixed in position within the valve body 4. The sleeve is provided with a plurality of inlet openings 51 through which fluid enters it when a valve member is in position to open the inlet passages 51. The valve member is hollow and through it liquid flows upwardly and passes outwardly through one or more outlet openings 52 which discharge into a groove 53 in the exterior of the sleeve 50. It is from the space 54 that the outlet openings 22 in the wall portion of the valve body 4 permit the discharge of liquid.

The valve cartridge contains a hollow valve stem member which extends outwardly beyond the sleeve 50 and is provided with an end 55 shaped to be engaged by the portion 56 of a cap 57. Within the space enclosed by the cap 57 and fitting about the valve stem portion 55 is an operating member 58. As shown, this member is positioned about the part 56 of the cap and is grooved as at 59. It is also provided with a depending portion 60 which terminates in an outwardly directed flange 61. The cap 57 is provided with an opening 62 through which a portion 63 of the operating lever or handle 64 may extend. The handle is provided also with a ring-like portion 65 which embraces the valve stem end 55 and is positioned within the groove 59 of the member 58.

The cap 57 may be provided with an anti-friction liner 66 made of plastic or other comparable material. The liner is also provided with a portion 67 which extends through the opening 62 in the cap 57 and is shaped to provide a pair of bearing portions 68 and 69 which are contacted by the handle portion 63. The cap 57 and the member 58 are held in place upon the upper end 55 of the valve stem by a screw 70 or any other suitable fastening member. By means of the member 70, the valve stem operating and finishing parts are held in place with respect to the valve stem which can be rotated and reciprocated by a suitable movement of the handle 64. A finishing piece 71 may be fastened to the cap by any means desired.

The depending portion 60 is held in place on the valve body 4 by a threaded ring 72 which is provided with a flange 73 overlying the flange 61 of the member 60. The cap 57 may receive a threaded collar or closing ring 74 as shown in FIGURE 1.

If desired, the faucet of this invention when installed may have associated with it a finishing member which is generally elongated, is hollow and opened downwardly. This member, the shell 75, is shown in transverse section in FIGURE 1 and in longitudinal section in FIGURE 2. It is shaped to overlie the water supply pipes such as the member 9 shown in FIGURE 3 and to enclose also the other parts associated with water supply pipes. A cup-like member 76 may be held in place by a nut 77 and a cup-like member is drawn up to grip a portion of a sink between the finishing member 75 and the flange 78 which preferably formed integrally with the member 13. Packing or sealing means 79 may, if desired, be positioned below the member 78 so that the tight seal is formed between the faucet and the sink below it.

The use and operation of this invention are as follows:

The faucet for use is generally assembled upon a sink, the details of which form no essential part of the invention. The faucet is also connected to a source of hot and a source of cold water. When the valve member within the sleeve 50 is so positioned as to close the openings 51, no water enters. The closing position of the valve stem is generally its lowermost position. When it is desired to cause water to flow through the faucet, the valve stem is raised or otherwise moved to open the openings 51. The hot and cold water then flows through the supply pipes through the openings in the valve body 4 through the openings 51 in the valve sleeve 50 and into the hollow valve member within the sleeve.

Since the valve stem may be rotated by the handle 64, the openings in the valve stem may be adjusted with respect to the openings 51 to control the mixing and proportioning of the hot and cold water, to position the valve stem so that no hot water enters, so that no cold water enters or so that hot and cold water both enter in the desired proportions. When the valve has been rotated to the position to produce the desired mixing of hot and cold water, water will be discharged through the faucet in the desired direction and at the desired temperature.

It is pointed out earlier, the discharge of mixed water from the faucet may be in either of two directions. A hose carrying a spray or other member for use is connected to the connection 17 and this spray is provided preferably adjacent its handle portion with a valve.

When it is desired to discharge water through the spout 3, the valve controlling flow to the spray is left closed. Water then flows in the direction of the arrows indicated in FIG. 1. In this position, the diverter is raised. The flexible member 46 is free to bulge outwardly and is not gripped between the surfaces 39 and 40. Water may then flow from the supply pipes through the openings 51 to the interior of the hollow valve stem, thence through the openings 52, the space 54, the passages 22 and finally through the outlet or discharge opening 2 into the spout 3. When the parts are in this condition, the hose will also be full of water because the passage 20 and the passage 14 are open. Hence water will accumulate in the space 24 under the diverter.

If now it is desired to discharge water through the hose to the spray rather than through the spout, the valve stem is left in the position to which it has already been moved by the lever handle 64. Then the valve controlled passage through the hose is open. Water may now escape through the hose. When this occurs, the movement of water through the passages 14 and 20 rapidly draws the water from within the annular space 24 beneath the diverter. The discharge of water from the space 24 rapidly draws the diverter down to the position shown in FIGURE 2. In that position, the flexible member 46 is as shown in FIGURE 2 tightly gripped at its upper edge between the surfaces 39 and 40. Hence, further discharge through the spout 3 is rapidly terminated and all the discharge occurs downwardly through the passages 20 and 14 and finally through the member 16 to the discharge passage 17 which is connected to the hose. Flow of water will continue in this direction so long as the valve controlling the hose itself is open and so long as the valve stem in the faucet remains in the open position.

The construction just described and particularly the passage 25 provides quick and positive means for moving the diverter from the upper position to the lower position. It may be said that when the valve adjacent the spray handle is open, the diverter is "snapped" from the upper position of FIGURE 1 to the lower position of FIGURE 2 and the discharge through the spout 3 is almost instantaneously cut off. This is desirable of course.

For purposes of convenience, the faucet has been shown in FIGURES 1 and 2 in a vertical position. This is not essential. The faucet may, if desired, be inclined. Its operation is not limited to a vertical nor to a generally erect position. It is shown in that position and has been described in that position purely as a matter of convenience and simplicity.

It is important to notice that the provision of the passages 25, through which liquid flows from the space 24 when the spray valve is open, produces a booster effect; while it is always useful in the operation of the faucet and in connection with the downward movement of the diverter it is of particular importance where the water pressure is low and the operation of the diverter may be slow and unsatisfactory, particularly when it is moving to the downward position of FIGURE 2. Under low pressure conditions, the flow of the water alone downwardly might not move the diverter from the up position of FIGURE 1 to the down position of FIGURE 2 rapidly enough to give a quick, sharp action.

To insure a rapid action of the diverter even under low pressure conditions, the passages 25 are important. When they are present, the diverter is moved downwardly not only by the flow of water downwardly past the diverter but also by the suction or vacuum action in which the water is pulled or sucked from immediately below the diverter through the passages 25 as a result of this sudden withdrawal of water through these passages by the positive action of the suction. This diverter is drawn downwardly rapidly and in effect is snapped down. The force effective through the passages 25 is thus added to that which is present as the result of the downward flow of the liquid past the diverter as is shown for example by the arrows in FIGURE 2.

When the diverter is moved in the reverse direction, obviously water may enter readily through the passages 25 to fill the chamber or space 24 promptly and to effect rapid raising of the diverter from the position of FIGURE 2 to that of FIGURE 1.

A feature of the invention which adds to the effectiveness of the means for moving the diverter is found in the fact that the area of the diverter is less at the top of the diverter and larger at the bottom. Thus another force is added to cause prompt movement of the diverter in the downward direction. This area relationship produces a pressure differential effective to push or force the diverter downwardly at the beginning of its downward movement when the spray valve is opened. At the beginning of this movement, it is possible that the preferred pressure differential effect is such that the water is pushed outwardly through the passages 25 by the downward movement of the diverter somewhat prior to the development of sufficient velocity of flow through the passage 20 to cause the complete emptying of the chamber 24 by suction or vacuum resulting from the downward flow of water to the spray.

Whereas the preferred form of the invention has been shown and described herein, it should be realized that there are many modifications, substitutions and alterations thereto, within the scope of the following claims.

I claim:

1. In combination in a mixing faucet having a hollow valve body with a plurality of inlets and a plurality of outlets and a housing movably positioned thereabout and defining therewith a discharge chamber, a diverter movably positioned within said discharge chamber, a pressure chamber adjacent said discharge chamber, said diverter extending into said pressure chamber, a plurality of discharges from said discharge chamber and means for moving said diverter, said means including an exhaust passage leading from said pressure chamber to one of said discharge passages from said discharge chamber whereby when fluid moves through said one of said discharge passages, said diverter is bodily moved by the flow of liquid through said exhaust passage into said last mentioned discharge passage.

2. In combination in a mixing faucet having a hollow valve body with a plurality of inlets and a plurality of outlets and a housing movably positioned thereabout and defining therewith a discharge chamber, a diverter movably positioned within said discharge chamber, and about said valve body, a pressure chamber adjacent said discharge chamber, said diverter extending into said pressure chamber, a plurality of discharges from said discharge chamber and means for moving said diverter, said means comprising an exhaust passage leading from said pressure chamber to one of said outlet passages from said discharge chamber whereby when fluid moves through said one of said discharge passages, said diverter is bodily moved by the flow of liquid through said exhaust passage into said last mentioned discharge passage.

3. In combination in a mixing faucet having a hollow valve body with a plurality of inlets and a plurality of outlets and a housing movably positioned thereabout and defining therewith a discharge chamber, a diverter movably positioned within said discharge chamber, a pressure chamber adjacent said discharge chamber, said diverter extending into said pressure chamber, a plurality of discharges from said discharge chamber and means for moving said diverter, said means comprising an exhaust passage leading from said pressure chamber to one of said outlet passages from said discharge chamber from a point beneath said diverter whereby when fluid moves through said one of said discharge passages, said diverter is bodily moved by the flow of liquid through said exhaust passage into said last mentioned discharge passage.

4. In combination in a mixing faucet having a hollow valve body with a plurality of inlets and a plurality of outlets and a housing movably positioned thereabout and defining therewith a discharge chamber, a diverter movably positioned within said discharge chamber and about said valve body, a pressure chamber adjacent said discharge chamber, said diverter extending into said pressure chamber, a plurality of discharges from said discharge chamber and means for moving said diverter, said means comprising an exhaust passage leading from said pressure chamber to one of said outlet passages from said discharge chamber from a point beneath said diverter whereby when fluid moves through said one of said discharge passages, said diverter is bodily moved by the flow of liquid through said exhaust passage into said last mentioned discharge passage.

5. In combination in a mixing faucet, a hollow valve body having two inlets and means for conducting liquid into said body, two outlet means through which liquid is selectively discharged from said body, valve means mounted within said body to control the entrance of liquid into said body, a housing positioned about said valve body and defining with the said body a discharge chamber, one outlet from said chamber positioned to discharge into a spout carried by said housing, a second outlet from said chamber positioned to discharge liquid in a different direction and a movable diverter positioned in said discharge chamber and about said valve body, a pressure chamber adjacent said discharge chamber, said diverter extending into said pressure chamber and means for moving said diverter to control the direction of discharge of liquid from said discharge chamber, a passage in said body connecting said discharge chamber and said second mentioned discharge point and an exhaust passage leading from said pressure chamber to the passage from said pressure chamber.

6. In combination in a mixing faucet, a hollow valve body having two inlets and means for conducting liquid into said body, two outlet means through which liquid is selectively discharged from said body, valve means mounted within said body to control the entrance of liquid into said body and the mixing of liquid therein, a housing positioned about said valve body and a defining with the said body a discharge chamber, one outlet from said chamber positioned to discharge into a spout carried by said housing, another outlet from said chamber positioned to discharge liquid in a different direction and a movable diverter positioned in said discharge and about said valve body, a presure chamber adjacent said discharge chamber, said diverter extending into said pressure chamber, and means for moving said diverter to control the direction of discharge of liquid from said discharge chamber, a passage in said body connecting said discharge chamber and said second mentioned discharge point and an exhaust passage leading from said pressure chamber to the passage from said discharge chamber.

7. In combination in a mixing faucet, a hollow valve body having two inlets and means for conducting liquid into said body, two outlet means through which liquid is selectively discharged from said body, valve means mounted within said body to control the entrance of liquid into said body, a housing positioned about said valve body and a defining with the said body a discharge chamber, one outlet from said chamber positioned to discharge into a spout carried by said housing, another outlet from said chamber positioned to discharge liquid in a different direction and a movable diverter positioned in said discharge and about said valve body, a pressure chamber adjacent said discharge chamber, said diverter extending into said pressure chamber and means for moving said diverter to control the direction of discharge of liquid from said discharge chamber, a passage in said body connecting said discharge chamber and said second mentioned discharge point and an exhaust passage leading from said pressure chamber adjacent its bottom to the passage from said discharge chamber.

8. In combination in a mixing faucet, a hollow valve body having two inlets and means for conducting liquid into said body, two outlet means through which liquid is selectively discharged from said body, valve means mounted within said body to control the entrance of liquid into said body, a housing positioned about said valve body and a defining with the said body a discharge chamber, one outlet from said chamber positioned to discharge into a spout carried by said housing, another outlet from said chamber positioned to discharge liquid in a different direction and a movable diverter positioned in said discharge and about said valve body, a pressure chamber adjacent said discharge chamber, said diverter extending into said pressure chamber, and means for moving said diverter to control the direction of discharge of liquid from said discharge chamber, said diverter including a rigid shell and a flexible member positioned therein, stops in said discharge chamber for limiting the movement of said diverter, a passage in said body connecting said discharge chamber and said second mentioned discharge point and an exhaust passage leading from said pressure chamber adjacent its bottom to the passage from said discharge chamber.

9. In combination in a mixing faucet, a hollow valve body having two inlets and means for conducting liquid into said body, two outlet means through which liquid is selectively discharged from said body, valve means mounted within said body for rotation and reciprocation to control the entrance of liquid into said body and the mixing of liquid therein, a housing positioned about said valve body and a defining with the said body a discharge chamber, one outlet from said chamber positioned to discharge into a spout carried by said housing, another outlet from said chamber positioned to discharge liquid in a different direction and a movable diverter positioned in said discharge and about said valve body, a pressure chamber adjacent said discharge chamber, said diverter extending into said pressure chamber, and means for moving said diverter to control the direction of discharge of liquid from said discharge chamber, a passage in said body connecting said discharge chamber and said second mentioned discharge point and an exhaust passage leading from said pressure chamber adjacent its bottom to the passage from said discharge chamber.

10. In combination in a mixing faucet, a hollow valve body having two inlets and means for conducting liquid into said body, two outlet means through which liquid is selectively discharged from said body, valve means mounted within said body for rotation and reciprocation to control the entrance of liquid into said body and the mixing of liquid therein, a housing positioned about said valve body for rotation and a defining with the said body a discharge chamber, one outlet from said chamber positioned to discharge into a spout carried by said housing, another outlet from said chamber positioned to discharge liquid in a different direction and a movable diverter positioned in said discharge and about said valve body, a pressure chamber adjacent said discharge chamber, said diverter extending into said pressure chamber, and means for moving said diverter to control the direction of discharge of liquid from said discharge chamber, said diverter including a rigid shell and a flexible member positioned therein, stops in said discharge chamber for limiting the movement of said diverter, a passage in said body connecting said discharge chamber and said second mentioned discharge point and an exhaust passage leading from said pressure chamber adjacent its bottom to the passage from said discharge passage.

11. In combination in a mixing faucet, a hollow valve body, a plurality of inlets thereto and a plurality of outlets therefrom, means for supplying hot and cold water to said inlets, a discharge housing movably positioned about said valve body, said housing defining with said body a discharge chamber between the two, an outlet from said chamber and a spout communicating therewith, said spout positioned upon said housing, the discharge outlets from said valve body positioned to communicate with said discharge chamber, a discharge passage from said discharge chamber leading in a direction away from said spout outlet, a diverter movably positioned in said discharge chamber and adapted for longitudinal reciprocation therein, a pressure chamber adjacent said discharge chamber, said diverter extending into said pressure chamber, stops limiting the movement of said diverter, an exhaust passage adjacent one end of said pressure chamber and leading therefrom to the passage from said discharge chamber, said exhaust passage being adapted to withdraw liquid from said pressure chamber upon the flow of liquid through the passage from said discharge chamber, said diverter including a relatively rigid outer shell and a relatively flexible inner member positioned therein, said shell and the adjacent portion of said valve body dimensioned to grip the flexible member of said diverter when the shell is in one position and to free said flexible member when the shell is in another position.

12. In combination in a faucet, a housing, means defining two separated outlets therefrom, a diverter chamber in said housing and in communication with each of said outlets, a diverter movably mounted therein, and means for causing rapid movement of said diverter, said means comprising a liquid chamber beneath said diverter, means defining a liquid path leading from said diverter chamber and extending to one of said outlets, and a separate passage from said liquid chamber to said liquid path defining means.

13. In combination in a faucet, a housing, means defining two separated outlets therefrom, a diverter chamber in said housing and in communication with each of said outlets, a diverter movably positioned within said chamber, a liquid passage to one of said outlets from said diverter chamber, means for moving said diverter positively and rapidly in response to movement of liquid toward said outlet, said means comprising a pressure chamber beneath said diverter and a separate escape passage from said pressure chamber to said liquid passage.

14. In combination in a faucet, a housing, means defining two outlets therefrom, a diverter chamber in said housing and in communication with each of said outlets, a diverter positioned for longitudinal movement therein, and means for establishing a positive force on said diverter to move it rapidly toward one outlet as a result of liquid flow toward said outlet, a liquid passage from said diverter chamber to said outlet, said means comprising a pressure chamber under said diverter and a separate liquid relief passage from said pressure chamber communicating with the liquid passage to said last mentioned outlet.

References Cited by the Examiner
UNITED STATES PATENTS

| | | | |
|---|---|---|---|
| 2,772,690 | 12/1956 | Mercier et al. | 137—119 |
| 2,998,824 | 9/1961 | Ward | 137—119 |
| 3,204,654 | 9/1965 | Moen | 137—119 |

WILLIAM F. O'DEA, *Primary Examiner.*

ISADOR WEIL, *Examiner.*

D. ZOBKIW, *Assistant Examiner.*